United States Patent
Eastgate

[19]
[11] Patent Number: 6,163,641
[45] Date of Patent: Dec. 19, 2000

[54] OPTICAL WAVEGUIDE FOR UV TRANSMISSION

[76] Inventor: Harold Frederick Eastgate, 8 Cassinia Close, Knoxfield, Victoria 3180, Australia

[21] Appl. No.: 09/101,097

[22] PCT Filed: Jan. 3, 1997

[86] PCT No.: PCT/AU97/00001

§ 371 Date: Jul. 1, 1998

§ 102(e) Date: Jul. 1, 1998

[87] PCT Pub. No.: WO97/25637

PCT Pub. Date: Jul. 17, 1997

[30] Foreign Application Priority Data

Jan. 3, 1997 [AU] Australia .................. PN7379

[51] Int. Cl.⁷ ...................... G02B 6/20
[52] U.S. Cl. ............................ 385/125; 385/142
[58] Field of Search .................... 385/125, 142, 385/143, 146

[56] References Cited

U.S. PATENT DOCUMENTS 5,412,750  5/1995  Nath ......................... 385/125
5,675,689  10/1997  Nath ......................... 355/142

*Primary Examiner*—Jon Henry
*Attorney, Agent, or Firm*—Ladas & Parry

[57] ABSTRACT

An optical waveguide for transmitting ultraviolet (UV) radiation, said waveguide including a tube (4), and a liquid core (1) filling said tube, said liquid core including a lithium or strontium salt, or mixture thereof.

23 Claims, 4 Drawing Sheets

OPTICAL WAVEGUIDE FOR UV TRANSMISSION

The present invention relates to optical waveguides generally and to liquid core optical waveguides for the transmission of ultra-violet (UV) radiation in particular.

In the prior art waveguides have been used for a variety of medical, dental and industrial applications to transmit both coherent and incoherent radiation at relatively high energy levels and at ultraviolet, visible and infrared wavelengths.

One type of waveguide which is known in the prior art consists of a series of mirrors arranged along an articulated arm, the laser beam being reflected from mirror to mirror along the arm. However, it will be apparent that such an arrangement has only limited flexibility, and is sensitive to errors in alignment, as well as being bulky and relatively expensive to manufacture and maintain.

Another general type of light waveguide which is known in the prior art employs the principle of total internal reflection to transmit light along a column or core of material, usually quartz or glass. The step-index fibres consist of a central core of glass or quartz surrounded by an optical cladding layer which has a refractive index lower than that of the core material. Light incident on the junction between core and cladding will be almost totally reflected if the angle of incidence, measured from a line normal to the junction, is greater than a critical value. Thus, light can be transmitted along the fibre and around bends, provided that the radius is not too small. In the gradient-index fibres, the refractive index of the core material is highest at the axis of the fibre and decreases gradually towards the cladding, so that the light follows a smooth curved path inside the core instead of a sharp zigzag path as in the step-index fibres.

Glass core fibre optics will transmit wavelengths limited mainly to the visible and are thus not suitable for UV transmission. Quartz will transmit a wide range of wavelengths from the ultraviolet to the near infrared, but quartz waveguides, as well as being fragile, are very expensive and difficult to produce.

Although ideal for communications purposes, which require the transmission of low energy radiation over long distances, fibres of the previous type present great difficulties for the transmission of relatively large amounts of power over shorter distances.

The principal problem with these fibres is that they must be very thin (2–150 microns) to provide the required flexibility. Single fibres of quartz or the like are necessarily quite fragile, especially in applications where repeated flexing is required. Particularly in laser applications, the power densities in thin fibres can be high enough to cause breakdown of the core material due to non-linear and other effects. In addition, it is very difficult to successfully launch incoherent light beams that may be 50 mm or more in diameter, or large diameter laser beams, into fibres of this type without high losses.

Some optical fibres of this type have been formed from finely drawn quartz capillary tubes filled with a liquid, but the same problems of fragility, alignment, and breakdown of the material, prevent their use in any of the aforementioned applications requiring high power levels.

Bonding large numbers of single glass fibres together to form flexible fibre optic bundles of much greater diameter than single fibres has been useful for a number of applications. However, with use, the individual fibres begin to fracture, leading to increasing numbers of "dead spots" and decreasing efficiency of the bundle. Also, because only the cores of individual fibres transmit light and these make up only a percentage of the cross-sectional area of a fibre optic bundle, light falling on the material between the fibres is not transmitted, but absorbed. This causes initial losses proportional to the non-transmitting area of the bundle, and, if the energy of the incident light beam is high enough, destruction of the bundle. Thus, waveguides of this type cannot usually be used for transmission of high energy radiation.

Optical fibres with plastic cores have been described, but because of the nature of the materials from which they are constructed, they have high light losses, can operate only at low temperatures, and are generally not suitable for UV transmission.

U.S. Pat. No. 3,740,113 describes a flexible light guide comprising a liquid-filled plastic tube. However, the core liquids disclosed therein have certain limitations which render then unsuitable in many applications. For example, such a light guide is completely unsuitable for the transmission of laser energy or high power incoherent light.

U.S. Pat. No. 4,045,119, by the present applicant, describes a flexible, liquid core waveguide for the transmission of a relatively high powered laser beam to the area of application. Although this waveguide is adequate or acceptable for a number of applications, it may not be possible to use such waveguides for transmission at certain wavelengths.

International Patent Application PCT/AU94/00658 by the present applicant describes an optical waveguide for transmitting radiation, said waveguide including a tube having an inner lining and a liquid core filling said tube and having a refractive index greater than that of the lining material. Whilst such a light guide is a significant advance in the art, it is not specifically tailored for transmission in the ultraviolet.

Waveguides including a liquid core of approximately 15 to approximately 60% w/w $CaCl_2$ are known and will transmit partly into the ultraviolet region. However, such waveguides generally do not transmit well below 250 nm.

Accordingly, it is an object of the present invention to overcome, or at least alleviate, one or more of the difficulties associated with the prior art.

Accordingly, in a first aspect of the present invention there is provided an optical waveguide for transmitting ultraviolet (UV) radiation, said waveguide including:
 a tube, and
 a liquid core filling said tube, said liquid core including a lithium or strontium salt, or mixture thereof.

Surprisingly it has been found that the use of strontium or lithium salts or mixtures thereof in the liquid core results in an optical waveguide which is particularly suitable for transmission in the UV and may transmit as low as approximately 200 nm. Many strontium and lithium salts also have the desirable properties of being chemically stable and of low toxicity.

The liquid core including a lithium or strontium salt or mixture thereof may be an aqueous solution of said salt. Preferably, the lithium or strontium salt is a lithium or strontium halide. Strontium chloride, lithium chloride and lithium bromide are particularly preferred.

For most applications, it is desirable to use the highest possible concentration of lithium or strontium salt in the aqueous solution. Thus, it is desirable to make the solution as saturated as possible, whilst avoiding crystallization at the temperature range of interest. This in turn generates the highest possible numerical aperture. At room temperature, the concentration of the aqueous solution is preferably up to approximately 45% w/w, more preferably approximately 25%–45% w/w for lithium chloride, up to approximately 60% w/w, more preferably approximately 30%–60% w/w for lithium bromide, and up to approximately 35% w/w, more preferably approximately 25%–35% w/w for strontium chloride. At 0° C., the concentration of the aqueous solution is preferably up to approximately 40% w/w for lithium chloride, up to approximately 57% w/w for lithium bromide, and up to approximately 30% w/w for strontium chloride.

In a particularly preferred embodiment, the waveguide according to the invention has a liquid core including an aqueous solution of approximately 800 g of $SrCl_2.6H_2O$ in sufficient water to make up 1 litre of solution.

In laser applications, there is no necessity for a high numerical aperture and transmission may be better at lower concentrations than those set forth above.

Preferably the core liquid is treated, for example by ion exchange, to reduce or substantially eliminate ion impurities therefrom. However, other salts, for example Ca, Mg, Mn, Ni and Co salts, and mixtures thereof, may be included in the core liquid to adjust the transmission spectrum of the resulting waveguide. The addition of such salts may result in waveguides which have transmission peaks at particular narrow wavelength range(s); the added salts effectively acting as an optical filter. This avoids the need for external filters. For example, by adding Co sulphate and Ni sulphate to a strontium chloride core liquid, a waveguide which transmits in a narrow band in the region of approximately 300 nm may be constructed. Similarly, the addition of Ni sulphate only may create transmission peaks at approximately 300 nm and 500 nm. Mixtures of strontium chloride, lithium chloride and lithium bromide, for example, may also be used to achieve similar results.

Preferably the core liquid is treated to reduce or substantially eliminate dissolved gases such as oxygen. Dissolved oxygen may absorb in the UV and, therefore, may be detrimental to performance. It is preferred to treat the core liquid by exposing it to an inert gas such as helium, argon, nitrogen or mixture thereof, preferably by a process known as sparging in which the gas is bubbled through the core liquid. Helium is particularly preferred. Alternatively, the core liquid may be subjected to a vacuum or ultrasonic degassing. Preferably the core liquid is treated to remove dissolved gases prior to filling the tube.

The tube may be of any suitable type: its nature and properties are riot critical to the present invention. Preferably the tube is flexible and substantially transparent to said UV radiation. The tube may be composed of a flexible plastic or the like, for example a fluoropolymer resin, including amorphous fluoropolymer resins. Desirably the tube material possesses one or more of the following characteristics: 1) inert; 2) non-inflammable; 3) resistant to relatively high temperatures.

The fluoropolymer resins may be selected from the group consisting of FEP, KEL-F, Teflon PFA, Tefzel and 3M THV-500 have been found to be suitable. Polyethylene, PVC, polycarbonate or other plastics may be used for some applications.

The tube does not have to be transparent or even flexible. It could, for example, be made of metal with a suitable lining. However a transparent tube may be desirable in certain applications to facilitate energy dissipation.

The tube may be unlined or it may include an inner lining. The inner lining may be of any suitable type: its nature and properties are not critical to the present invention. Preferably, the inner lining is substantially transparent to said radiation.

The inner lining may be formed from any suitable fluoropolymer, preferably amorphous fluoropolymer resin or fluoroacrylate polymer. The fluoropolymer resins Teflon AF-1600, Teflon AF-2400 and Cytop have been found to be suitable. The fluoroacrylate polymer may be selected from any one or more of the group consisting of poly (pentadecafluorooctyl acrylate), poly[tetrafluoro-3-(hexafluoro-propoxy) propyl acrylate], poly[tetrafluoro-3-(pentafluoro ethoxy) propyl acrylate], poly (undecafluorohexyl acrylate), poly(nonafluoro pentyl acrylate), poly[tetrafluoro-3-(trifluoromethoxy) propyl acrylale], poly(heptafluorobutyl acrylate), poly (octafluoropentyl acrylate), poly(pentafluoropropyl acrylate), poly[2-(heptafluorobutoxy) ethyl acrylate], poly [2,2,3,4,4,4-hexafluorobutyl acrylate], poly(trifluoroethyl acrylate), poly[2-(1,2,2-tetrafluoroethoxy)ethyl acrylate], poly(trifluoroisopropyl methacrylate), poly(2,2,2-trifluoro-1-methylethyl methacrylate), poly[2-(trifluoroethoxy)ethyl acrylate], poly(trifluoroethyl methacrylate). Several of these fluoroacrylates are available commercially. These include: the 3M fluorad 722, 724 and 725 solutions.

Preferably, the material to be used as the inner lining may be dissolved in a solvent, more preferably a fluorinated solvent, for application. For example, fluoropolymer resins such as Teflon AF and Cytop, although chemically resistant to other solvents and process chemicals, may be dissolved in perfluorinated solvents such as Fluorinert, Flutec and Hostinert. Teflon AF-1600 and Teflon AF-2400 are available as solutions already dissolved in Fluorinert FC-75 as Teflon AF-1601S-6, Teflon AF-1601S-18, and Teflon AF-2401S-1. Fluoroacrylate polymers may also be dissolved in perfluorinated solvents such as Fluorinert, Flutec and Hostinert or the like.

The inner lining may be applied in any suitable manner, for example spin coating, solution casting or painting. For example, an amorphous fluoropolymer resin dissolved in a perfluorinated solvent may be solution-cast onto the inner surface of the tube in thin, smooth coatings by applying the solution to the surface to be coated and then driving off the solvent with gentle heat. A fluoroacrylate polymer resin dissolved in a perfluorinated solvent may be solution-cast onto the inner surface of the tube in thin, smooth coatings by applying the solution to the surface to be coated and then permitting the solvent to evaporate. The perfluorinated solvents which may be used to dissolve the amorphous fluoropolymer or fluoroacrylate polymer resins may slightly soften the internal wall of the flexible tube, and this enhances the bonding of the materials. Silanes such as perfluorodecyltriethoxysilane may be useful also in facilitating bonding.

Preferably, the inner lining is from approximately 0.1 $\mu$m to approximately 10 $\mu$m thick. More preferably the internal coating is approximately 0.5 $\mu$m to 2 $\mu$m thick. For example, tubing such as FEP or PFA may have an internal coating approximately 1 $\mu$m thick that will act as the optical cladding.

The tube may be a composite material. For example, Tygon SE-200 has been found to be suitable. It is composed of Tygon with a thin internal lining of FEP. Applicant has discovered that whilst it has the same optical properties as solid FEP tubing, it is much more flexible. Similar composite tubing materials are Furon Pure-Line-1, which is polyethylene tubing lined with FEP, and Pennchem-A, which is a thermoplastic rubber tubing also lined with FEP.

The refractive index of the liquid core should be greater than that of the tube and/or inner lining.

It will be appreciated that the dimensions of the cladding tube are not critical to the invention, and will depend largely on application. Waveguides may be constructed in any diameter for which cladding tubing can be obtained or manufactured.

In use, the core diameter of the waveguide ideally matches the diameter of the light beam being transmitted, so that the light beam can be launched directly into the input window with minimal losses. For practical purposes, this is often not possible, so that the light beam may be larger than the core diameter, and a lens system may be employed to reduce the beam diameter to that of the core. However, applicant has discovered that the beam diameter may be matched to the core diameter by expanding the input end of the waveguide so that it tapers from the core diameter up to the diameter of the beam. In this way, the beam is refracted from the walls of the tapered section and reduced in diameter to the size of the core, so that the tapered section functions as a non-imaging concentrator. The size and shape of the tapered section will depend on a number of factors, such as the relative sizes of the beam and core, numerical aperture of the waveguide, and type of beam. In some cases, the walls may be a straight taper, in others they may be curved to obtain maximum concentration of the beam.

These same arrangements may also be used at the other end of the waveguide to modify the light output.

Accordingly, in a further aspect of the present invention there is provided an optical waveguide for transmitting radiation and functioning as a non-imaging concentrator, said waveguide including:

a tube comprising an input end, an output end and a tube body; and a liquid core filling said tube, said liquid core including a lithium or strontium salt, or mixture thereof;

wherein the diameter of the tube at one or more of said input end and said output end is greater than the diameter of said tube body.

For some applications of waveguide it may be necessary to transmit relatively high power levels continuously for long periods, with the result that heat may build up. Applicant has discovered that the liquid core may be circulated from the waveguide, through a cooling system, and back into the waveguide again in order to alleviate heat build up.

Accordingly, in a further aspect of the present invention there is provided an optical waveguide for transmitting radiation, said waveguide including:

a tube, and a liquid core filling said tube, said liquid core including a lithium or strontium salt, or mixture thereof;

wherein in use said liquid core is capable of being circulated through a cooling system to enable heat to be dispersed from said waveguide.

Desirably the core liquid should be sealed in the tube under pressure, making use of the natural resilience of the tube material. This assists in reducing or preventing the formation of voids and bubbles. However, in some circumstances it may be desirable to construct a liquid core waveguide in which the core is not under pressure.

For some applications, an optical waveguide according to the present invention may include sealing means at each end of the tube. The sealing means may be of any suitable type. Preferably, the sealing means includes an input window at one end of the tube and an output window at the other end, for the transmission of radiation into and from the tube, respectively. More preferably, the input and output windows are either sheets or plugs of a material with good optical transmission. Particularly suitable input and output windows are cylindrical plugs of a material transparent to the range of wavelengths to be transmitted. These plugs are preferably long in relation to their diameter and optically polished on the end faces and sides. Preferably, the diameter is chosen so that they fit firmly into the cladding tube. However, for some applications, windows at one end of the waveguide may be made of sheet material and fitted against the end of the tube.

Quartz is a preferred material for the windows as various grades transmit a range of wavelengths from 0.17 microns in the ultraviolet to 3.3 microns in the infrared. It is particularly preferred to use a UV grade quartz such as Suprasil™. Other materials such as optical glasses or polymers which transmit at suitable wavelengths may also be used.

Preferably the window material has a refractive index similar to the liquid core to minimise light losses at the core/window interface. The outer faces of tile windows may be coated with an anti-reflection coating to reduce entry and exit losses. For example, conventional coatings such as magnesium fluoride may be used. Applicants have also found that thin solution cast layers of amorphous fluoropolymers or fluoroacrylate polymers may be used as anti-reflective coatings on input and output windows.

If plugs are used as the sealing means, they may be sealed in the tube by means of a crimped outer metal sheath, or by other similar means. For example, sealing may be achieved by inserting the plugs into the tube to their full length and then swaging into place metal bands previously placed over the ends of the cladding tubes. Copper bands designed to be used in dentistry have been found to be particularly suitable for this purpose. They are available in pre-cut lengths of approximately 1.25 cm in a wide range of diameters and can be easily swayed over the tube and plugs to produce a seal. When swaged in place they do not substantially increase the outer diameter of the cladding tube. However, it will be apparent that sections of tubing of other materials, such as aluminium or stainless steel are also suitable for this purpose. Commercially available tube fittings, such as those made by Swagelok, are also suitable for sealing the tube. These may be made of metal, Teflon or Nylon. To ensure a more positive seal, the end plugs may be tapered so that they are slightly wider at their inner ends than at their outer ends.

Preferably at least one sealing means includes means for sealing the liquid core under pressure on assembly of the flexible waveguide.

Applications of Liquid-Core Waveguides

There is a wide variety of possible applications of the liquid-core waveguides according to the invention. Most of these applications depend on design and construction features described earlier, which give liquid-core waveguides certain advantages over conventional glass fiberoptics.

These applications include the following:

1. Light curing of inks (for example printing inks), polymers, resins and paints.
2. Scientific, forensic and industrial equipment and devices in which ultraviolet radiation is transmitted from the radiation generator to the point of application through a waveguide designed to transmit the particular wavelengths involved—eg. Use of a high-intensity light source, tunable over a range of ultraviolet wavelengths, and then transmitted through an appropriate liquid-core waveguide, for the detection of fingerprints, document examination, and a number of other forensic applications. In similar and related uses for the purposes of examination or analysis, specific wavelengths can be transmitted through liquid core waveguides and directed at materials or surfaces causing fluorescence or other detectable optical effects.
3. Industrial, medical and scientific laser transmission at ultraviolet wavelengths.

The present invention will now be more fully described with reference to the accompanying Examples and drawings. It should be understood, however, that the description following is illustrative only and should not be taken in any way as a restriction on the generality of the invention described above.

IN THE FIGURES

KEY TO THE FIGURES

1. Liquid Core.
2. Window (eg. Quartz).
3. Swaged metal sealing bands.
4. Tube of fluoropolymer (eg. FEP or PFA), or other suitable material.
5. Amorphous fluoroacrylate polymer lining forming optical cladding.
6. Tapered, liquid-filled section of optical cladding tube forming non-imaging concentrator.
7. Tapered end-window covered with optical cladding material forming solid non-imaging concentrator.
8. Example of condensing lens system.
9. Fluid reservoir.
10. O-ring seal.
11. Window retaining ring.
12. Filling channel.
13. Body of input terminal.
14. Screw cap (eg. FEP).
15. Aperture.
16. Groove for O-ring.
17. Machined non-imaging concentrator (eg. FEP).

EXAMPLE 1

Non-imaging Concentrator

Figure 1:
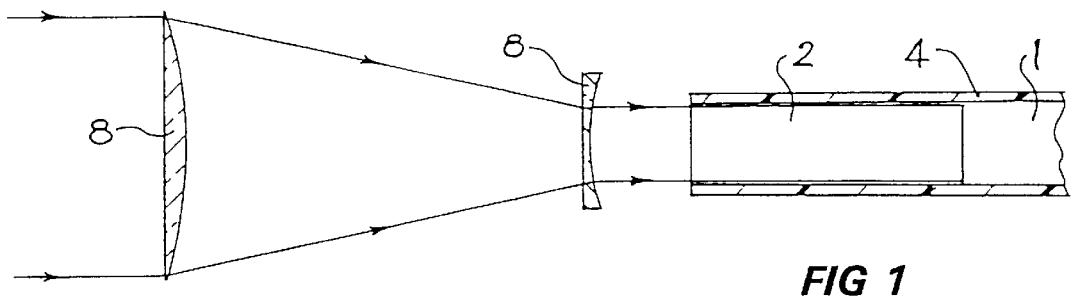
FIG. 1 shows a lens system which may be employed to reduce the beam diameter to that of the core.

Previously, lens systems (FIG. 1) have been employed to reduce the beam diameter of that core.

Figure 2:
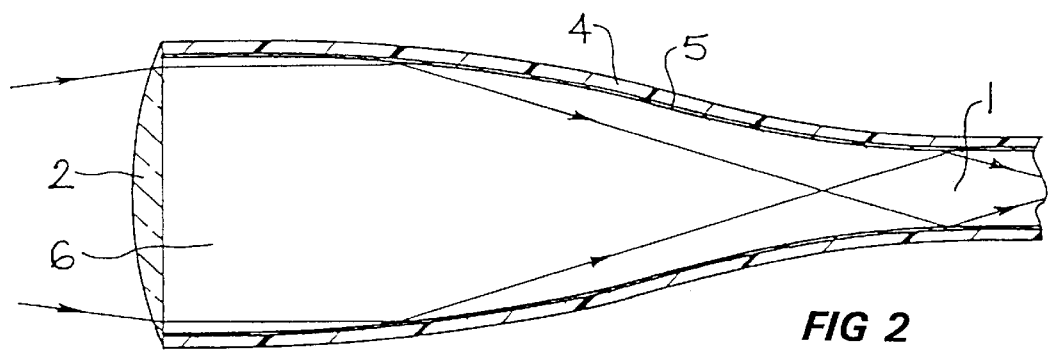
FIGS. 2–4 show non-imaging concentrators according to the invention.

A non-imaging concentrator according to the present invention may be formed by tapering the liquid filled section of the optical cladding tube or lining (FIG. 2).

Figure 3:
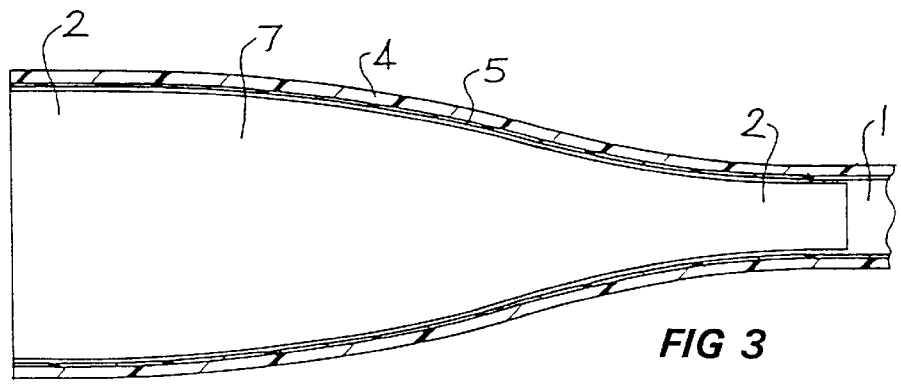

For small diameter waveguides, eg. 2 mm, the optical end plug may be constructed from quartz or glass rod of the same diameter as the beam and drawn out, for example, in a flame, so that it tapers to the diameter of the core (FIG. 3). It may be fitted to the input end of the waveguide in such a way that it is covered with the cladding tube material.

For larger diameter waveguides it may be easier to expand the cladding tube up to the diameter of the beam, seal the end with a window, fill the waveguide plus expanded section from the other end with core liquid and seal this end.

Figure 4:
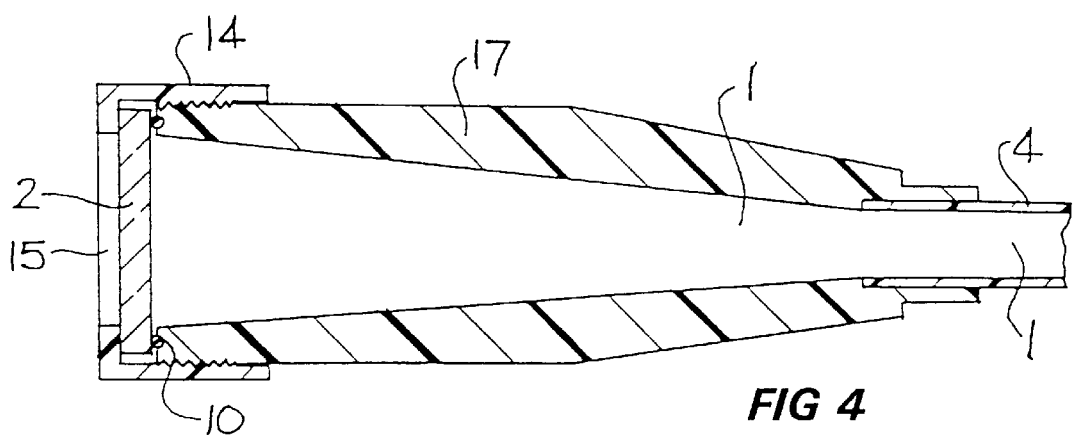

The expanded section may be integral with the cladding tube or may be a separate section made of the same material as the tube and joined to it by a socket and use of a suitable cementing system such as Loctite Prism 770 primer and 406 adhesive (FIG. 4). The expanded section may be constructed in a number of ways, such as injection moulding or machining from a rod of, for example, FEP (FIG. 4). In some cases, it may be advantageous to use this concentrator in combination with a lens, so that the lens takes the place of the input window. A non-imaging concentrator placed at the output end of the waveguide, so the light rays will pass through it in reverse, can also serve to modify the output beam of the waveguide.

EXAMPLE 2

Waveguides

Waveguide 29-34

Figure 7:
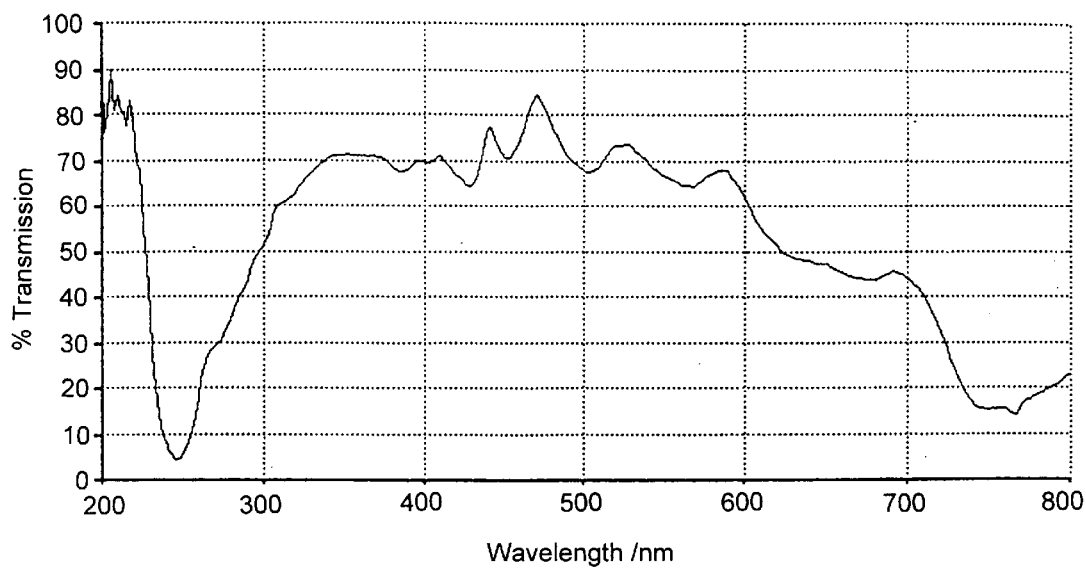
FIG. 7 shows a transmission spectrum for the waveguide designated 29-34, graphing % transmission versus wavelength (nm).
Figure 9:
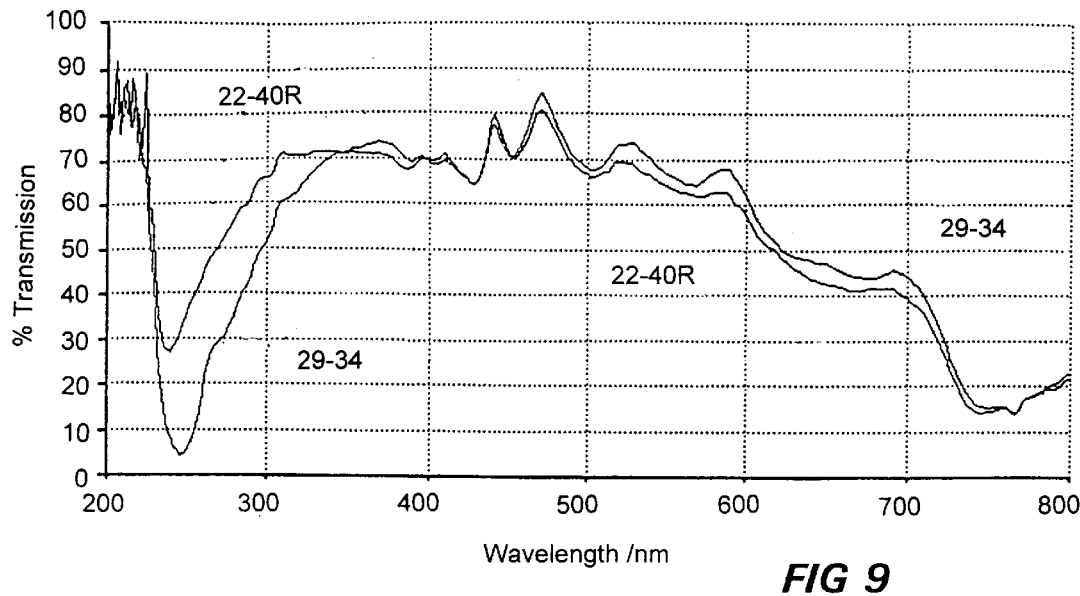
FIG. 9 shows transmission spectra for the waveguides designated 29-34 and 22-40R.
Figure 10:
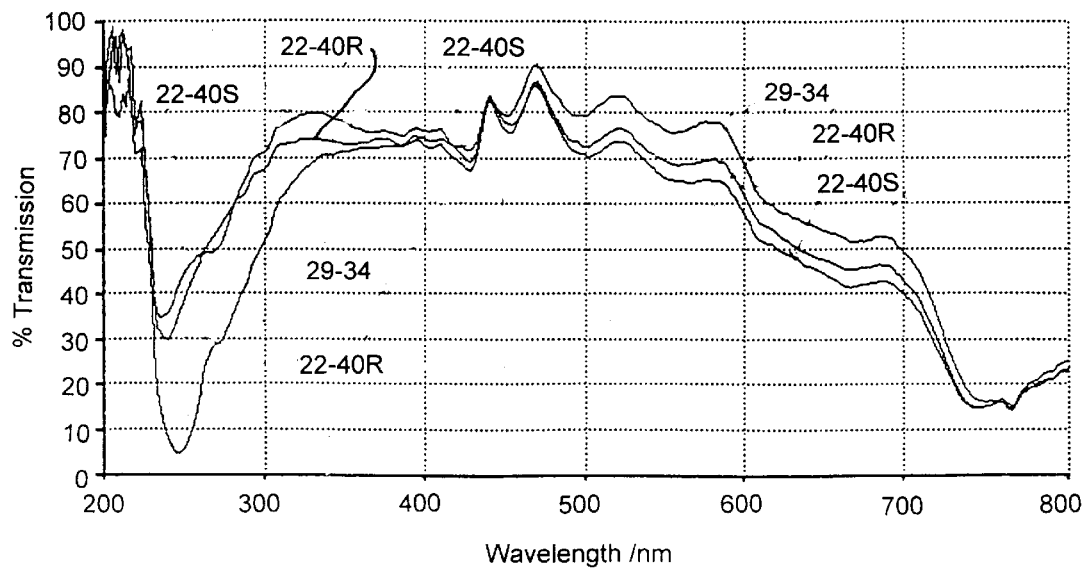
FIG. 10 shows transmission spectra for the waveguides designated 29-34, 22-40R and 22-40S.

For comparative purposes, a waveguide comprising a FEP tube lined with Fluorad 722 with a $CaCl_2$ core was constructed. The liquid core was an aqueous solution of calcium chloride (56.4% w/w). The transmission spectrum of this waveguide is shown in FIGS. 7, 9 and 10.

Waveguide 22-40R

Figure 8:
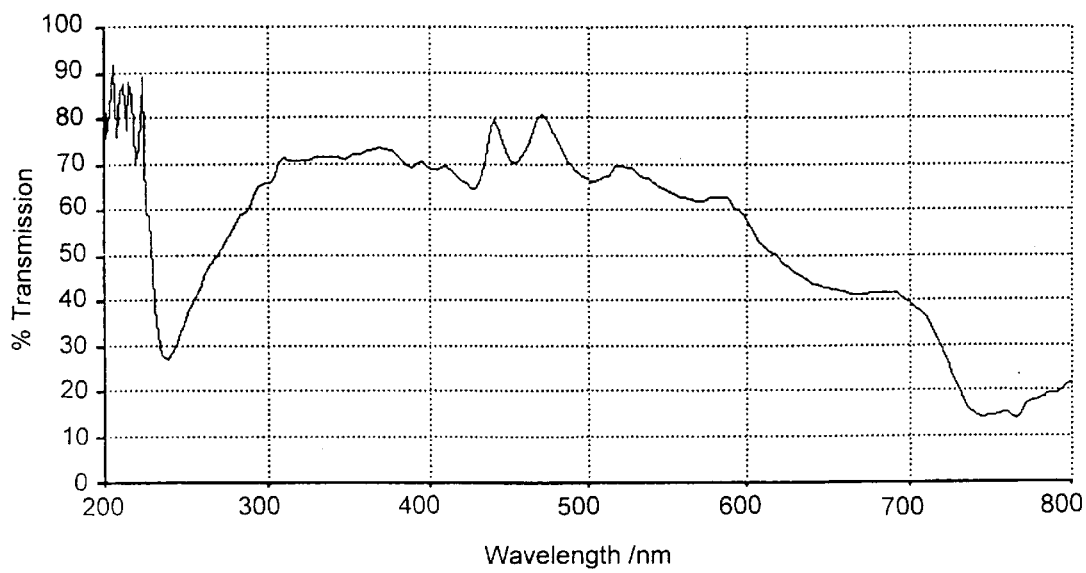
FIG. 8 shows a transmission spectrum for the waveguide designated 22-40R.

A waveguide comprising an unlined FEP tube with a strontium chloride core was constructed. The liquid core was an aqueous solution of strontium chloride (48% w/w). The transmission spectrum of this waveguide is shown in FIGS. 8, 9 and 10.

Waveguide 22-40S

A waveguide comprising an unlined FEP tube with a strontium chloride core was constructed. The liquid core was an aqueous solution of 800 g of $SrCl_2.6H_2O$ in 1 litre of solution. The strontium chloride solution was treated by ion exchange to substantially remove ion impurities therefrom. The transmission spectrum of this waveguide is shown in FIGS. 9 and 10.

EXAMPLE 3

Preparation of Waveguides

Figure 5:
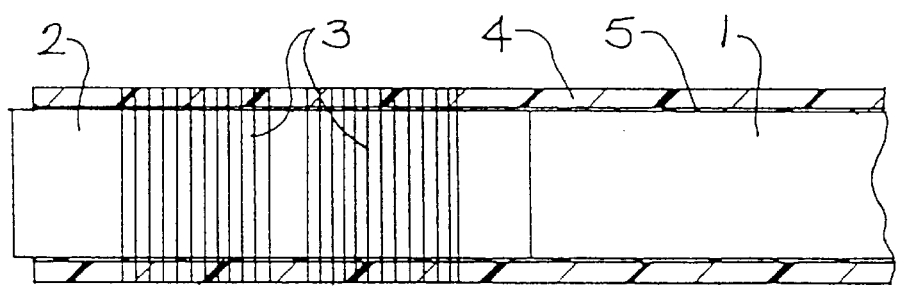
FIG. 5 shows a sealing means according to the invention.

The abovementioned examples, and most other configurations of the waveguide, may be constructed in the following way:

1. The components are selected.
2. The optical cladding tube is cut to size, and metal sealing bands placed over each end in the correct position. These should be selected so they fit firmly over the outside of the cladding tube without constricting the bore. With Dental copper bands, usually two are used at each end. The tube is then thoroughly cleaned with deionized water, or other suitable solvents, and filtered compressed nitrogen.
3. The first optical plug is inserted to its full length in one end of the tube, and sealed into position by swaging the bands over it (FIG. 5). A modified tube cutter may be used for this purpose, or any other device that will swage the bands into position. The most positive seal is obtained when the metal bands are swaged by a continuous spiral groove.
4. The tube is hung vertically, sealed end down, and approximately 95% filled with core liquid. The open end is covered loosely, and the tube is left for a period to ensure that any trapped air will rise to the surface and be eliminated.

5. The tube is then filled completely and the tip of the second optical plug is placed in the bore a short distance, making sure that no air is trapped. The other end of the plug is placed in a Swagelok (or similar device) of the correct size, held in a clamp, and pushed into the tube to its full length. The Swagelok, which has been modified for the purpose, is tightened so it grips the extreme end of the tube and holds the plug firmly in place.

6. The metal bands are then swaged to seal the plug firmly in the tube, the Swagelok is removed, and the tube end trimmed if necessary. If the diameter and length of the optical plug is chosen correctly, it can be pushed into the tube without leakage of any fluid, and the core is now sealed in the tube under pressure, or in a compressed condition. The length of the plug will vary, depending on the diameter and length of the cladding tube, and the type of core liquid. For example, in a waveguide 1–6 meters long and 8 mm internal diameter the optical plugs may be 40 mm long (FIG. 5). As mentioned previously, if a Swagelok compression fitting (or similar device) is to be used as a permanent seal at either end of the tube, it is not necessary to use the swaged metal bands on that end, and the Swagelok is not removed after sealing.

7. For some waveguides, particularly those of narrow diameter, it may be desirable to fill the tube by gravity or suction before any windows are fitted and then fit and seal the windows.

Figure 6:
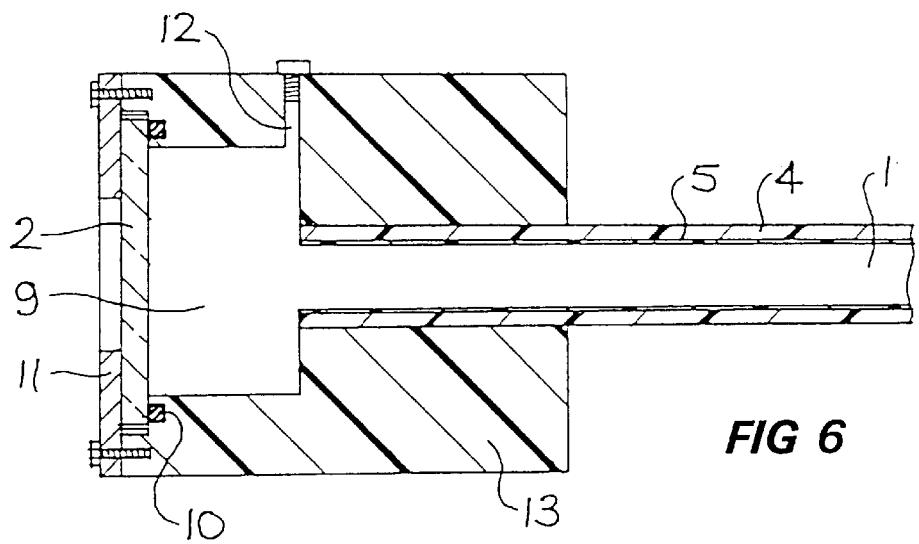
FIG. 6 shows an input terminal that may be used instead of a transparent plug in waveguides designed to transmit laser radiation.

8. For most applications, liquid core waveguides are constructed as described above, ie. with the tube permanently sealed at each end and the liquid core either compressed or under pressure. However, for the transmission of pulsed laser radiation, it may be desirable to construct a liquid core waveguide in which the core is not under pressure. In this case an input terminal may be designed as in FIG. 6. This comprises a window of quartz, or other suitable material, sealing the input end of the waveguide. Separating this window from the waveguide tube is a fluid reservoir of larger diameter than the tube. The coherent laser beam can then pass through the input window and reservoir and enter the waveguide tube. Leading from the fluid reservoir to the top of the input terminal is a small channel which may be sealed with a screw. This channel may be used to fill the waveguide so that the liquid level lies above the reservoir, ie. in the channel. Alternatively, the input terminal may be constructed without the filling channel, and the tube filled as usual from the output end, before it is sealed. The input terminal may be constructed of any suitable material, such as stainless steel, Teflon FEP or Teflon PFA resin.

9. A protective outer sheath of any suitable material, end terminals and other fittings can then be installed.

10. During the assembly process, great care should be taken with cleanliness. Although workable waveguides can be constructed in a normal atmosphere, there is likely to be present several hundred thousand small particles per litre of air, which will contaminate the waveguide and degrade its performance. Much better results are obtained by doing all assembly under clean-room conditions. A class 350 clean-room with a class 3.5 workbench where the actual assembly takes place would be ideal. Care should also be taken that the core liquids are as pure and uncontaminated as possible. If necessary, they should be passed through a filter with a pore size of 0.1 or 0.2 microns, then subjected to a vacuum, or ultrasonic degassing, to remove dissolved gases. In some cases it may be desirable to fill the waveguide under a partial vacuum, to further reduce the possibility of dissolved gases or small bubbles being incorporated in the liquid core. In other cases, particularly in waveguides designed to transmit below 300 nm, it may be desirable to bubble helium, argon or nitrogen through the liquid core to remove traces of oxygen which starts to absorb UV radiation at these wavelengths.

11. If the waveguide tube is to be internally coated with, for example, Teflon AF-2401S-1, a procedure similar to that outlined in DuPont Production information publication H-44585-1 may be used. If the waveguide tube is internally coated with, for example, poly(pentadecafluorooctyl acrylate), a procedure similar to that outlined in DuPont Production information publication H-44585-1 is used, but heating is not required. Mild heating below 100° C. may be applied if desired. Alternatively, a procedure similar to that outlined in "3M Fluorad Fluorochemical Coating FC-722 Introductory Technical Information" may be used.

12. If the waveguide is of the type with one end expanded to form a non-imaging concentrator, then the concentrator is attached and this end is sealed first. Then the tube is filled by any convenient method and the second end is sealed as outlined above.

Finally it is to be understood that various other modifications and/or alterations may be made without departing from the spirit of the present invention as outlined herein.

What is claimed is:

1. An optical waveguide for transmitting ultraviolet (UV) radiation, said waveguide including:
   a tube, and
   a liquid core filling said tube, said liquid core including a lithium or strontium salt, or mixture thereof.

2. An optical waveguide according to claim 1, wherein the waveguide may transmit UV radiation as low as approximately 200 nm.

3. An optical waveguide according to claim 1, wherein the liquid core includes an aqueous solution of a lithium or strontium halide.

4. An optical waveguide according to claim 3, wherein the lithium or strontium halide is selected from the group consisting of strontium chloride, lithium chloride, lithium bromide and mixtures thereof.

5. An optical waveguide according to claim 4, wherein
   when lithium chloride is present, lithium chloride is present in amounts of up to approximately 45% w/w;
   when strontium chloride is present, strontium chloride is present in amounts up to approximately 35% w/w; and
   when lithium bromide is present, lithium bromide is present in amounts of up to approximately 60% w/w, when measured at room temperature.

6. An optical waveguide according to claim 1, wherein the core liquid is treated to reduce or substantially eliminate any impurities therefrom.

7. An optical waveguide according to claim 1, wherein the core liquid is treated to reduce or substantially eliminate dissolved gases therefrom.

8. An optical waveguide according to claim 7, wherein the core liquid is exposed to an inert gas to remove oxygen therefrom.

9. An optical waveguide according to claim 7, wherein the inert gas is selected from the group consisting of helium, argon, nitrogen or mixtures thereof in a sparging process.

10. An optical waveguide according to claim 7, wherein the cool liquid is subjected to a vacuum or ultrasonic degassing process.

11. An optical waveguide according to claim 1, wherein the core liquid further includes other salts selected from the group consisting of calcium magnesium, manganese nickel and cobalt salts and mixtures thereof to adjust the transmission spectrum of the resulting waveguide.

12. An optical waveguide according to claim 11, wherein cobalt sulphate and nickel sulphate are added to a strontium chloride core liquid to provide a waveguide which transmits in a narrow band in the region of approximately 300 nm.

13. An optical waveguide according to claim 11, wherein nickel sulphate is added to a strontium core liquid to provide an optical waveguide having transmission peeks at approximately 300 nm and 500 nm.

14. An optical waveguide according to claim 1, wherein the tube is a flexible tube of a material substantially transparent to said UV radiation.

15. An optical waveguide according to claim 14, wherein the tube material includes a fluoropolymer resin selected from any one or more of the group consisting of FEP, KEL-F, Teflon PFA, Tefzel and 3M THV-500.

16. An optical waveguide according to claim 14, wherein the tube includes an inner lining formed from a fluoropolymer resin or fluoroacrylate polymer.

17. An optical waveguide according to claim 16, wherein the inner lining is formed from a fluoropolymer resin selected from any one or more of the group consisting of Teflon AF-1600, Teflon AF-2400 and Cytop.

18. An optical waveguide according to claim 16, wherein the inner lining is formed from a fluoroacrylate polymer selected from any one or more of the group consisting of poly(pentadecafluorooctyl acrylate), poly[tetrafluoro-3-(heptafluoro-propoxy) propyl acrylate], poly[tetrafluoro-3-(pentafluoro ethoxy) propyl acrylate], poly(undecafluorohexyl acrylate), poly(nonafluoro pentyl acrylate), poly[tetrafluoro-3-(trifluoromethoxy) propyl acrylate], poly(heptafluorobutyl acrylate), poly(octafluoropentyl acrylate), poly(pentafluoropropyl acrylate) poly[2-(heptafluorobutoxy) ethyl acrylate], poly[2,2,3,4,4,4-hexafluorobutyl acrylate], poly(trifluoroethyl acrylate), poly[2-(1,2,2-tetrafluoroethoxy)ethyl acrylate], poly(trifluoroisopropyl methacrylate), poly(2,2,2-trifluoro-1-methylethyl methacrylate), poly[2-(trifluoroethoxy)ethyl acrylate], and poly(trifluoroethyl methacrylate).

19. An optical waveguide according to claim 16, wherein the inner lining is from approximately 0.1 $\mu$m to approximately 10 $\mu$m thick.

20. An optical waveguide for transmitting radiation and functioning as a non-imaging concentrator, said waveguide including:

a tube comprising an input end, and output end and a tube body; and a liquid core filling said tube, said liquid core including a lithium or strontium salt, or mixture thereof;

wherein the diameter of the tube at one or more of said input end and said output end is greater than the diameter of said tube body.

21. An optical waveguide according to claim 20, wherein the liquid core includes an aqueous solution of lithium or strontium halide or mixtures thereof.

22. An optical waveguide for transmitting radiation, said waveguide including:

a tube, and a liquid core filling said tube, said liquid core including a lithium or strontium salt, or mixture thereof;

wherein in use said liquid core is capable of being circulated through a cooling system to enable heat to be dispersed from said waveguide.

23. An optical waveguide according to claim 22, wherein the liquid core includes an aqueous solution of lithium or strontium halide or mixtures thereof.

* * * * *